(12) United States Patent
Aoyagi et al.

(10) Patent No.: US 9,124,376 B2
(45) Date of Patent: Sep. 1, 2015

(54) COMMUNICATION DEVICE AND COMMUNICATION METHOD

(75) Inventors: Kenichiro Aoyagi, Tokyo (JP); Sadayuki Abeta, Tokyo (JP); Yasuyuki Watanabe, Tokyo (JP); Hideyuki Matsutani, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 86 days.

(21) Appl. No.: 14/125,460

(22) PCT Filed: Jun. 4, 2012

(86) PCT No.: PCT/JP2012/064399
§ 371 (c)(1),
(2), (4) Date: Dec. 11, 2013

(87) PCT Pub. No.: WO2013/001987
PCT Pub. Date: Jan. 3, 2013

(65) Prior Publication Data
US 2014/0113582 A1    Apr. 24, 2014

(30) Foreign Application Priority Data
Jun. 30, 2011   (JP) ................................ 2011-146219

(51) Int. Cl.
*H04W 4/22* (2009.01)
*H04H 20/59* (2008.01)
*H04W 48/12* (2009.01)
(Continued)

(52) U.S. Cl.
CPC .............. *H04H 20/59* (2013.01); *H04W 48/12* (2013.01); *H04W 76/002* (2013.01); *H04W 4/22* (2013.01); *H04W 76/007* (2013.01); *H04W 76/046* (2013.01)

(58) Field of Classification Search
CPC ......... H04W 4/22; H04W 4/08; H04W 4/021; H04H 20/59
USPC .......................... 455/404.1, 404.2, 456.1, 567
See application file for complete search history.

(56) References Cited

U.S. PATENT DOCUMENTS 8,204,502 B2 * 6/2012 Khetawat et al. .............. 455/436
2009/0270097 A1 * 10/2009 Gallagher et al. .......... 455/435.1
(Continued)

OTHER PUBLICATIONS

International Search Report issued in PCT/JP2012/064399 mailed on Jul. 3, 2012 (4 pages).
(Continued)

*Primary Examiner* — Cong Tran
(74) *Attorney, Agent, or Firm* — Osha Liang LLP (57) ABSTRACT

A communication device includes a network side communication unit that receives emergency information from an information broadcasting node; and a UE side communication unit that communicates a communication signal with user equipment (UE) through a radio base station. The UE side communication unit broadcasts a Secondary Notification signal including the emergency information, subsequent to broadcasting a Primary Notification signal providing notice of broadcasting of the emergency information, and individually transmitting a command signal for transition of an RRC protocol state or switching to another cell to the UE. The transition of the RRC protocol state is from a state where reception of the emergency information is disabled to a state where reception of the emergency information is enabled, and the other cell is such that the UE can receive the Secondary Notification signal, irrespective of the RRC protocol state of the UE.

10 Claims, 5 Drawing Sheets

(51) Int. Cl.
*H04W 76/00* (2009.01)
*H04W 76/04* (2009.01)

(56) References Cited

U.S. PATENT DOCUMENTS

2010/0178895 A1* 7/2010 Maeda et al. ............... 455/404.1
2011/0171925 A1* 7/2011 Faccin et al. ............... 455/404.1
2012/0282875 A1* 11/2012 Park et al. .................. 455/404.1
2013/0094393 A1* 4/2013 Cheng ......................... 370/252

OTHER PUBLICATIONS

Written Opinion of the International Searching Authority issued in PCT/JP2012/064399 mailed on Jul. 3, 2012 (3 pages).

3GPP TS 25.304 V8.11.0; "3rd Generation Partnership Project; Technical Specification Group Radio Access Network; User Equipment (UE) procedures in idle mode and procedures for cell reselection in connected mode (Release 8)"; Sep. 2010 (50 pages).

* cited by examiner

COMMUNICATION DEVICE AND COMMUNICATION METHOD

CROSS-REFERENCE TO RELATED APPLICATIONS

The present application is a national stage application of PCT/JP2012/064399 filed Jun. 4, 2012, which claims priority to Japanese Patent Application No. JP2011-146219, filed Jun. 30, 2011. The priority applications are hereby incorporated by reference in their entirety.

TECHNICAL FIELD

The present invention relates to a communication device and a communication method.

BACKGROUND ART

In an earthquake early warning distribution infrastructure for mobile radio communication (e.g., CBS, ETWS, and CMAS), by broadcasting information by a simultaneous broadcasting signal, a warning can be quickly made to a broad range of users, without establishing dedicated channels for corresponding users. As the simultaneous broadcasting signal, for example, a paging signal through a Common Control Channel (CCCH); a reporting signal through a Broadcast Control Channel (BCCH); or a signal (e.g., BMC) through a Common Traffic Channel (CTCH) may be considered.

Usually, broadcast information, which is broadcast during an earthquake and tsunami, for example, is transmitted by transmitting a Primary Notification signal and subsequently transmitting a Secondary Notification signal. The Primary Notification signal provides advance notice of broadcasting of emergency information by minimum information, such as "earthquake" or "tsunami." The Secondary Notification signal indicates details (emergency information), such as seismic intensity in each place and an epicenter. In this manner, by dividing information broadcasting into two steps, broadcast information can be quickly and flexibly broadcast. As an example, the Primary Notification information is transmitted through the common control channel (CCCH), and the Secondary Notification information is transmitted through the common traffic channel (CTCH).

For a case of a mobile communication system, such as based on the wideband code division multiple access (WCDMA) scheme, user equipment (UE) which is in an idle (IDLE) mode (in which a connection is not established) or in a paging (Cell_PCH) mode (in which connection is not released but no user data is transmitted nor received) can properly receive the common traffic channel (CTCH). However, user equipment (UE) which transmits and receives user data (which UE is in a cell DCH (Cell_DCH) mode or in a cell FACH (Cell_FACH) mode) performs communication without referring to the common traffic channel (CTCH). Accordingly, a problem is that a user of the user equipment, whose communication mode (RRC protocol state) is the Cell_DCH mode or the Cell_FACH mode, may not quickly notice existence of broadcast information, or even if the user notices it, the user may not properly receive it. Non-Patent Document 1, for example, discloses that user equipment in a specific RRC protocol state can receive broadcast information.

To address this problem, it can be considered to design user equipment (UE), so that it can receive the common traffic channel (CTCH) even in a state (Cell_DCH) in which a dedicated channel is established, for example. However, if such a function were mandatory for user equipment (UE), the user equipment would be required to always monitor the common traffic channel (CTCH), in addition to transmission and reception of user data. Consequently, the concern would be that the battery energy would be consumed quicker, and that cost of the user equipment (UE) would be increased.

RELATED ART DOCUMENT

Non-Patent Document

[NON-PATENT DOCUMENT 1] 3GPP TS25.304 V8.11.0 (2010-09), 6.2

SUMMARY OF THE INVENTION

Problem to be Solved by the Invention

The object of the present invention is to enable user equipment to receive a Secondary Notification signal including emergency information, when the user equipment in an RRC protocol state in which user data can be communicated receives a Primary Notification signal, which provides notice of broadcasting of emergency information.

Means for Solving the Problem

A communication device according to one embodiment includes a network side communication unit that receives emergency information from an information broadcasting node; a UE side communication unit that communicates a communication signal with user equipment through a radio base station; wherein the UE side communication unit broadcasts a Secondary Notification signal including the emergency information, subsequent to broadcasting a Primary Notification signal providing notice of broadcasting of the emergency information, and individually transmitting a command signal to the user equipment, wherein the command signal is for commanding transition of an RRC protocol state or for commanding switching to another cell. The transition of the RRC protocol state is from a state in which reception of the emergency information (the Secondary Notification) is disabled to a state in which reception of the emergency information (the Secondary Notification) is enabled, and wherein the other cell is the cell in which the user equipment is capable of receiving the Secondary Notification signal irrespective of the RRC protocol state of the user equipment.

Effect of the Present Invention

According to the embodiment, when the user equipment in an RRC protocol state in which communication of the user data is enabled receives the Primary Notification signal, which provides the notice of broadcasting of the emergency signal, the user equipment can be made to be capable of receiving the Secondary Notification signal including the emergency information.

EMBODIMENTS FOR CARRYING OUT THE INVENTION

According to an embodiment described below, when user equipment recognizes initiation of emergency information broadcasting, the user equipment determines whether transition is to be made from a current communicating state (e.g., a state of data communication other than voice communication) to a state in which reception of broadcast information is enabled (e.g., Cell_PCH or IDLE). When the transition is to be made, the state is transitioned. The state transition may be made after making an inquiry to a network, or the state transition may be autonomously made in a side of the user equipment. Alternatively, after being triggered by receiving the emergency broadcast information, a network control device RNC may identify the user equipment which is incapable of receiving such broadcast information, and the network control device RNC may prompt the identified user equipment for the state transition. In this manner, the user equipment that is incapable of receiving the emergency broadcast information due to being in a communication state is able to quickly transition to a state in which the emergency broadcast information can be received. Thus, the emergency broadcast information can be reported to as many units of the user equipment as possible.

1. Communication system
2. Operation example
3. Modified operation example
3.1 Switching of a cell or a RAT
3.2 Barring a transition request
3.3 Autonomous transition by user equipment
4. Radio network controller RNC
5. User equipment UE

EXAMPLE 1

<1. Communication System>

Figure 1:
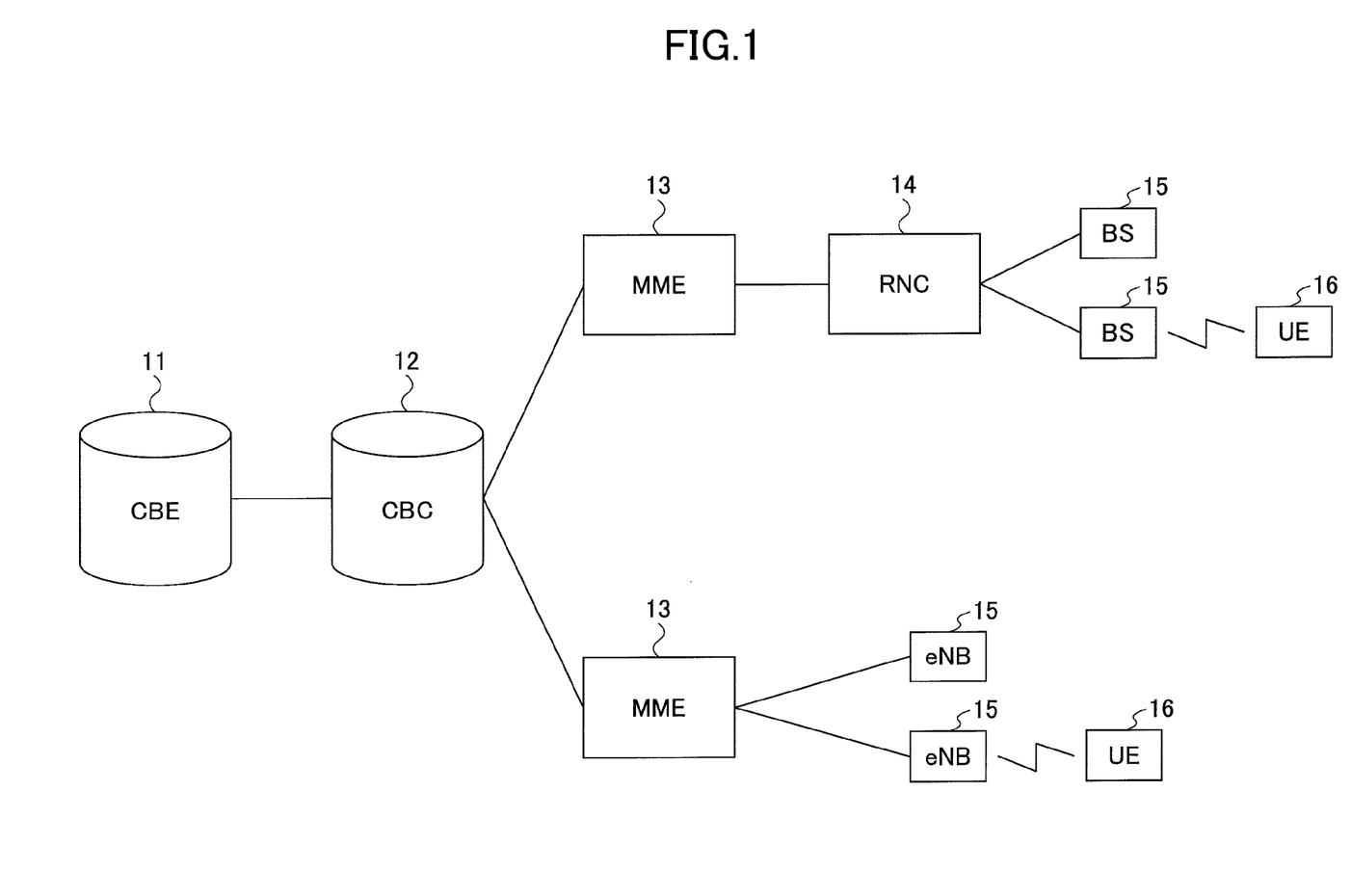
FIG. 1 is a diagram showing an outline of a communication system.

FIG. 1 shows a communication system which can be used in the embodiment. FIG. 1 shows nodes which are particularly related to the embodiment, among various nodes included in the communication system. For convenience of explanation, the communication system is assumed to be a third generation mobile communication system, such as a WCDMA system or a GSM system. However, the present invention may be applied to another communication system (e.g., a second generation mobile communication system). The communication system includes a CBE 11 which is a cell broadcast entity; a CBC 12 which is a cell broadcast center; a MME 13 which is a mobile switching center (or mobile management entity); an RNC 14 which is a radio network controller; an eNB 15 which is a base station of an LTE system; a BS (or NodeB) 15 which is a base station of the 3G system; and UEs 16 which are units of user equipment.

The cell broadcast entity (CBE) 11 is an information source which provides broadcast information at a time of disaster. Specifically, a local government or a Government (e.g., Meteorological Agency) corresponds to the CBE, for example.

The cell broadcast center (CBC) 12 creates broadcast information, which is actually to be broadcast to user equipment, based on information which is provided from the CBE 11. The CBC 12 may determine a region or an area in which the broadcast information is to be broadcast, based on the information which is provided from the CBE 11. For example, when an earthquake occurs, a region may be specifically identified in which a concern is danger of tsunami.

In general, the mobile switching center MME 13 performs call processing of user equipment. For example, the mobile switching center (MME) 13 performs management of subscriber information, mobility management, call origination and termination processing, a billing process, and QoS control. The mobile switching center (MME) 13 according to the embodiment transmits broadcast information to a node (a radio network controller RNC and/or a base station eNB), which is specified by the CBC 12.

In general, the radio network controller RNC 14 performs a process which is related to call processing of user equipment. For example, for user equipment of a third generation mobile communication system, it performs processing of control signals (which are related to Radio Resource Control (RRC)); state management; connection processing; handover processing; and maintenance management of a network. The radio network controller (RNC) 14 according to the embodiment forwards broadcast information to a base station in an area, which is specified by the CBC 12. The user equipment (UE) 16 according to the embodiment operates in any one of a plurality of RRC protocol states (communication states). The radio network controller (RNC) 14 manages an RRC protocol state of the user equipment (UE) 16. Specifically, the RRC protocol states in the third generation mobile communication system are a cell DCH state (Cell_DCH); a cell FACH state (Cell_FACH); a cell PCH state (Cell_PCH); and an idle state (IDLE). In the cell DCH state (Cell_DCH), dedicated channels are established for uplink and downlink, and user data and control data are communicated in a bidirectional manner. In the cell FACH state (Cell_FACH), no dedicated channels are established. However, user data and control data can be communicated by using a shared channel. In the cell PCH state (Cell_PCH), transmission and reception of user data are disabled, and control signals are discontinuously received. Unlike the other three states, in the idle state (IDLE), the RRC connection is not established. In the cell PCH state (Cell_PCH) and in the idle state (IDLE), user equipment discontinuously receives a paging channel PICH to wait for a call. The RRC connection is established in response to a call from the network, or in a case of originating a call. Here, in the cell DCH state (Cell_DCH) and in the cell FACH state (Cell_FACH), user equipment UE does not monitor a common traffic channel CTCH. However, in the cell PCH state (Cell_PCH) and in the idle state (IDLE), user equipment UE monitors the common traffic channel CTCH. In any one of the states, user equipment can receive a common control channel CCCH. However, in the cell DCH state (Cell_DCH) and in the cell FACH state (Cell_FACH), user equipment UE is incapable of receiving an emergency message which is broadcast through the common traffic channel CTCH. In the cell PCH state (Cell_PCH) and in the idle state (IDLE), user equipment UE can receive such an emergency message. In this point, it is different from the LTE mobile communication system in which user equipment UE can receive emergency broadcast information even if the RRC protocol state is a connected state (Connected) or the idle state (IDLE).

The base station (eNB) 15 of the LTE system is a base station in an LTE mobile communication system. The base station (eNB) 15 performs, for example, allocation control of radio resources for performing radio communication with the user equipment (UE) 16.

The base station BS (or NodeB) 15 of the 3G system is a base station in a third generation mobile communication system.

The user equipment (UE) 16 may be any suitable communication device that enables a user to perform radio communication in both or one of the LTE mobile communication system and the third generation mobile communication system, and that is capable of receiving broadcast information such as ETWS information. Typically, user equipment is a cellular phone. However, it may be another device. For example, user equipment may be an information terminal; a high capability mobile telephone; a smart phone; a tablet computer; a personal digital assistant; a mobile personal computer; a palmtop computer; a laptop computer, a desktop computer; or the like. The user equipment UE 16 operates in one of the plurality of RRC protocol states (communication states). Specifically, in the third generation mobile communication system, the RRC protocol states are the cell DCH state (Cell_DCH); the cell FACH state (Cell_FACH); the cell PCH state (Cell_PCH); and the idle state (IDLE). In the LTE mobile communication system, the RRC protocol states are the connected state (Connected) and the idle state (IDLE).

In FIG. 1, for simplicity of depicting, only the third generation mobile communication system and the LTE mobile communication system are depicted. However, another communication system may be included. For example, a second generation mobile communication system or an LTE advanced mobile communication system may be included.

<2. Operation Example>

Figure 2:
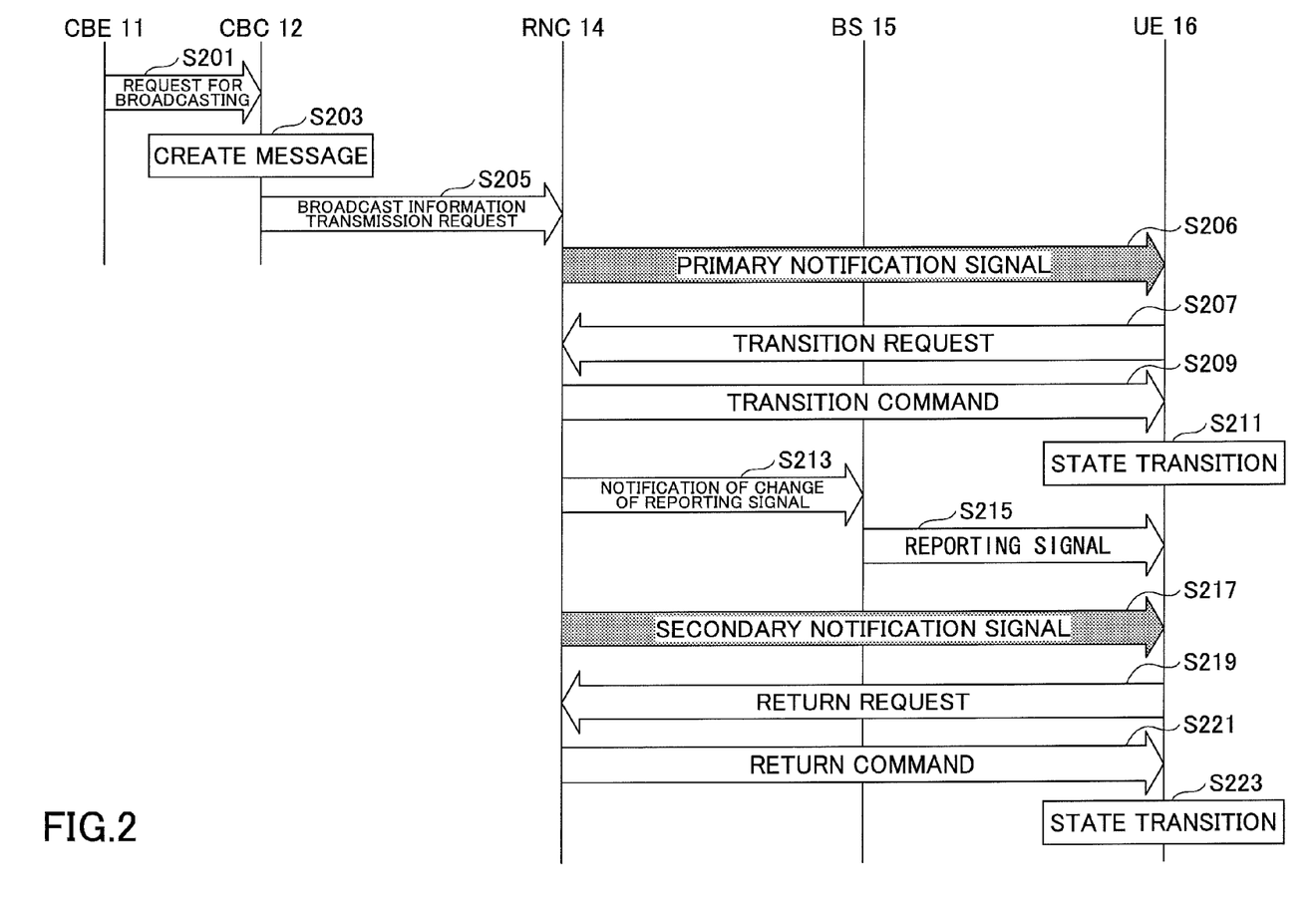
FIG. 2 is a diagram showing an operation example.

FIG. 2 shows an operation example which is performed in the third generation mobile communication system of the communication system which is shown in FIG. 1.

When a disaster, such as an earthquake, or an emergency occurs at step S201, the cell broadcast entity (CBE) 11, such as a local government or Meteorological Agency, requests the cell broadcast center (CBC) 12 to transmit broadcast information.

For example, when a disaster (such as an earthquake) occurs, an agency (CBE), such as Meteorological Agency, creates broadcast information, in response to detection of P-waves (Primary Wave), which is a preliminary tremor, and reports it to the cell broadcast center (CBC) 12.

At step S203, the cell broadcast center CBC 12 creates broadcast information or a message to be reported to user equipment (UE), based on the information which is received together with the request. When the broadcast information is to be transmitted to a limited specific area or a region, the cell broadcast center (CBC) 12 determines a broadcast area to which the broadcast information is transmitted.

At step S205, the cell broadcast center (CBC) 12 requests the radio network controller (RNC) 14 to transmit the broadcast information. As an example, broadcast information includes a disaster type; a broadcast area; Primary Notification information; and Secondary Notification information (a body of a message). The disaster type is represented by a message identifier or a serial number of the broadcast information. When a plurality of broadcast information pieces are transmitted at corresponding different timings, the latest one overwrites an old one. When the broadcast information is to be transmitted to the limited specific area, the "broadcast area" is information for identifying the specific area. The Primary Notification information includes the minimum information, such as "Earthquake," "Tsunami," "Earthquake+Tsunami," or the like. Other detailed information is included in the Secondary Notification signal or the body of the message as the emergency information. For convenience of explanation, the information received by the radio network controller (RNC) 14 is referred to as the "broadcast information," and it is assumed that the "emergency information" is included in the Secondary Notification signal, which is to be received by the user equipment (UE) 16. As long as there is no possibility of confusion, the broadcast information and the emergency information may be used as synonyms.

At step S206, the radio network controller RNC 14 broadcasts the Primary Notification signal including the minimum information piece, such as "Earthquake," "Tsunami," or "Earthquake+Tsunami," to units of user equipment. The Primary Notification signal is reported to the units of user equipment as a paging signal by using the common control channel CCCH. Since the Primary Notification information includes only the minimum information piece of the broadcast information, it can be quickly reported to the units of user equipment.

For convenience of the explanation, it is assumed that the user equipment (UE) 16 is operating in the cell FACH state (Cell_FACH). However, this is not mandatory for this embodiment, and the user equipment (UE) 16 may be operating in another state. For example, the user equipment (UE) 16 may be operating in the cell DCH state (Cell_DCH). The user equipment (UE) 16 does not receive the common traffic channel CTCH in the cell FACH state (Cell_FACH) nor the cell DCH state (Cell_DCH). Thus, the user equipment (UE) 16 is incapable of receiving the Secondary Notification signal in this state. However, even if the user equipment (UE) 16 is in the cell FACH state (Cell_FACH) or the cell DCH state (Cell_DCH), the user equipment (UE) 16 can receive the Primary Notification signal, which is transmitted through the common control channel CCCH at step S206.

For convenience of explanation, it is assumed that the radio network controller (RNC) 14 performs processing after step S205. However, it is not mandatory for the embodiment. The mobile switching center (MME) 13 or a core node, which is not shown in the figure, may perform the processing after step S205, instead of the radio network controller (RNC) 14.

At step S207, the user equipment (UE) 16 transmits a request signal for requesting state transition of the RRC protocol state to the radio network controller (RNC) 14 in response to the reception of the Primary Notification signal. As an example, the request signal may be transmitted by using an RRC message, which is "SIGNALING CONNECTION RELEASE INDICATION." For the case of the current example, the user equipment (UE) 16 is in the FACH state (Cell_FACH). The state transition which is requested by the request signal is the state transition from the FACH state (Cell_FACH) to the idle state (IDLE). However, the embodiment is not limited to this state transition, and different state transition may be requested. For example, transition from the FACH state (Cell_FACH) to the paging state (Cell_PCH); transition from the DCH state (Cell_DCH) to the idle state (IDLE); and transition from the DCH state (CELL_DCH) to the paging state (Cell_PCH) may be performed. In either case, it suffices if transition is performed from a state in which reception of the Secondary Notification signal is disabled to a state in which reception of the Secondary Notification signal is enabled. However, when transition is made from the DCH state (Cell_DCH) to the idle state (IDLE), since the RRC connection is released, it is not possible to continue the communication which is performed in the DCH state (Cell_DCH). Accordingly, when a transition source of the state transition is the DCH state (Cell_DCH), it is preferable that the state transition be from the DCH state (Cell_DCH), in which data communication other than the voice communication (e.g., a low priority e-mail) is performed. Similarly, when a transition source of the state transition is the FACH state (Cell_FACH), it is preferable that the state transition be from the FACH state (Cell_FACH), in which data communication other than the voice communication is performed.

At step S209, the radio network controller RNC 14 transmits a command signal for commanding to perform state transition to the user equipment (UE) 16, in response to the request signal which is received from the user equipment (UE) 16. The command signal is individually transmitted to each of specific units of the user equipment, which transmit the request signal.

At step S211, the user equipment UE 16 performs state transition in response to the command signal. For the case of the current example, the RRC protocol state transitions from the EACH state (Cell_FACH) to the idle state (IDLE).

At step S213, the radio network controller RNC 14 reports a change of reporting information to the base station 15. Reporting of the change of the reporting information may be made by a message, such as "SYSTEM INFORMATION CHANGE INDICATION."

At step S215, the base station 15 transmits the changed reporting information. The changed reporting information is for reporting timing and the like of the Secondary Notification signal to the user equipment, which is transmitted after the Primary Notification signal, which is reported at step S206. The procedures at steps S213 and S215 of reporting the change of the reporting information may be executed at the depicted timings, or may be executed together with step S206 of reporting the paging signal.

At step S217, the radio network controller RNC 14 broadcasts the Secondary Notification signal including the emergency information to the units of user equipment (UE) 16. The Secondary Notification signal may be reported as a Broadcast Multicast Control-Cell Broadcast Service message (BMC-CBS message) through the common traffic channel CTCH. Unlike the Primary Notification signal including only the minimum information, such as "Earthquake" or "Tsunami," the Secondary Notification signal includes detailed emergency information such as seismic intensity in each place and an epicenter. The user equipment in the DCH state (Cell_DCH) or in the FACH state (Cell_FACH) is incapable of receiving the Secondary Notification signal. However, at step S211, the user equipment UE 16 transitions from the FACH state (Cell_FACH) to the idle state (IDLE). Thus, the user equipment UE 16 can receive the Secondary Notification signal at the timing indicated by the reporting information, which is received at step S215. Usually, the Secondary Notification signal is transmitted at every predetermined time interval (i.e., the Secondary Notification signal is transmitted multiple times). The transmission timing and the transmission time intervals of the Secondary Notification signal are indicated by the changed reporting information at step S215. In theory, it is possible for the user equipment (UE) 16 to receive the Secondary Notification signal by always monitoring the common traffic channel CTCH after step S211, without using such timing information. However, from a perspective of battery saving, it is preferable to receive the Secondary Notification signal at the timing indicated by the changed reporting information (step S215), and to reduce power consumption during other timings.

At step S219, after completion of reception of the Secondary Notification signal, the user equipment (UE) 16 transmits a return request signal for returning to the original state to the radio network controller (RNC) 14. For the current example, since the original state is the cell FACH state (Cell_FACH), the return request signal requests state transition from the idle state (IDLE) to the cell FACH state (Cell_FACH). In this case, it is necessary to reestablish the RRC connection. Accordingly, for this case, the return request signal may be made by using a cell update message, which is used for requesting call connection when data to be transmitted occurs in the idle state (IDLE).

At step S221, the radio network controller (RNC) 14 transmits a command signal, which is for returning the state to the original state, to the user equipment 16. This command signal is individually transmitted to each of the specific units of the user equipment, which transmits the return request signal.

At step S223, the user equipment (UE) 16 performs state transition in response to the command signal. For the current example, the RRC protocol state transitions from the idle state (IDLE) to the FACH state (Cell_FACH).

<3. Modified Operation Example>
<<3.1 Switching of a Cell or a RAT>>

In the example shown in FIG. 2, the user equipment (which is operating in the state in which reception of the Secondary Notification signal including the emergency information is enabled) transitions to the state in which reception of the Secondary Notification signal is enabled. The embodiment is not limited to this case. For example, the user equipment (UE) 16 may be switched to a cell or a communication system (Radio Access Technology (RAT)) in which the Secondary Notification signal can be received, instead of transitioning to the state in which reception of the Secondary Notification signal is enabled. That is because the Primary and Secondary Notification signals are reported not only in the third generation mobile communication system, but also in another communication system.

Specifically, at step S207 of FIG. 2, the user equipment (UE) 16 requests transition of the operating state or switching of the RAT (or switching of the cell) from the radio network controller (RNC) 14. For example, suppose that the user equipment (UE) 16, which is served by a third generation mobile communication system, is also operable in a long term evolution (LTE) communication system, and that the user equipment (UE) 16 is located at a position in which the user equipment (UE) 16 can be switched to the LTE system or an LTE cell. For the case of the LTE communication system, the RRC protocol state of the user equipment is in the connected state (Connected) or the idle state (IDLE). In either case, the user equipment can receive the Primary Notification information and the Secondary Notification information. Accordingly, at step S209, the radio network controller (RNC) 14 may command such user equipment (UE) 16 to switch from the third generation communication system to the LTE communication system or the LTE cell. In such a case, at step S211, the user equipment (UE) 16 switches to the LTE communication system or the LTE cell, and the user equipment (UE) 16 receives the Secondary Notification signal at the switching destination, or the user equipment UE 16 receives both the Primary Notification signal and the Secondary Notification signal at the LTE communication system, which is the destination of switching. In this case, the return procedure by steps S219, S221, and S223 are not mandatory. The switching or transition from the third generation mobile communication system to the LTE mobile communication system may be performed by inter-system handover, or by Redirect, in which connection is temporarily released and reconnection is made.

The radio network controller (RNC) 14 may determine whether to allow switching and may determine the destination of switching, in response to the request signal requesting the state transition, or switching of the cell or the communication system, such as that of step S207. Such a determination may be made based on a communication state or a communication signal. For example, when a type of a communication call of a communication signal which is made by the user equipment (UE) 16 is for communication for which a requirement on latency is not strict (which is communication other than voice communication), the state transition, or switching of the cell or the communication system may be allowed. When it is not, transition or switching may be disallowed. As another example, when an amount of communication or a data amount is less than a predetermined threshold value, transition of the state, or switching of the cell or communication system may be allowed. When it is not, transition or switching may be disallowed. As another example, when a transmission rate of a communication signal which is made by the user equipment (UE) 16 is less than a predetermined threshold value, transition of the state, or switching of the cell or the communication system may be allowed. When it is not, transition or switching may be disallowed. As another example, when a communication signal made by the user equipment (UE) 16 is not for important communication, transition of the state, or the switching or the cell or the communication system may be allowed. When it is for important communication, transition or switching may be disallowed. The permissibility determinations of the above-described state transition are for exemplifying purpose only. The permissibility determinations may be made from another perspective.

Further, the radio network controller (RNC) 14 may store a result of the permissibility determination of the state transition and may memorize the units of the user equipment for which the transition is disallowed. In this case, the Secondary Notification signal may be reported to the user equipment, for which the transition is disallowed, by a dedicated signal or by dedicated data transmission.

In the example shown in FIG. 2, the radio network controller (RNC) 14 determines permissibility of the transition and the destination of the transition, in response to the request signal from the user equipment (UE) 16 at step S207. However, the permissibility of the transition and the destination of the transition may be determined irrespective of the request signal, and the command signal of step S209 may be transmitted. The radio network controller (RNC) 14 manages communication states (RRC protocol states) of all units of the user equipment (UE) 16 under control thereof. Accordingly, when the radio network controller (RNC) 14 receives broadcast information and is to transmit the broadcast information at step S205, the radio network controller (RNC) 14 is able to determine which units of user equipment are incapable of receiving the broadcast information. Specifically, the radio network controller (RNC) 14 identifies the units of the user equipment (UE) 16, whose communication states are the cell DCH state (Cell_DCH) or the cell FACH state (Cell_FACH), by referring to the communication states of the corresponding units of the user equipment (UE) 16. Here, the communication states are managed by a state management unit, as described later. At step S209, the command signal may be transmitted to the units of the user equipment, which are identified in this manner, and state transition and the like may be prompted.

<<3.2 Barring a Transition Request>>

In the example shown in FIG. 2, when the user equipment (UE) 16, which is in a state in which receiving of the Secondary Notification signal is disabled, receives the Primary Notification signal at step S206, the user equipment (UE) 16 transmits the request signal for requesting the state transition or the like at step S207. Accordingly, if there are a great number of units of the user equipment (UE) 16 which are in the states in which receiving of the Secondary Notification signal is disabled, or if throughput at the network side is not sufficient, a concern is that the radio network controller (RNC) 14 may be congested due to a great number of request signals.

From such a perspective, it can be considered barring transmission of the request signal by the user equipment (UE) 16 based on a certain criterion. For example, one or more of permissibility of transmitting the request signal; waiting time for start of transmission of the request signal (which is the elapsed time after receiving the Primary Notification signal); and the maximum number of times of transmitting the request signal may be set. Such setting items may be reported as reporting information to the user equipment (UE) 16 separately from the Primary Notification signal, or may be reported to the user equipment (UE) 16 together with the Primary Notification signal at step S206. In theory, it is possible to include these setting items in the Primary Notification signal. However, from a perspective of, for example, reducing an information amount of the Primary Notification signal and broadcasting it quickly and broadly, it is preferable to report such setting items separately from the Primary Notification signal.

<<3.3 Autonomous Transition by User Equipment>>

In the example shown in FIG. 2, the radio network controller (RNC) 14 (or the mobile switching center, for example) transmits the command for the state transition, or for switching of the cell or the communication system to the user equipment (UE) 16. However, this is not mandatory in the embodiment, and the user equipment (UE) 16 may autonomously determine the state transition.

Figure 3:
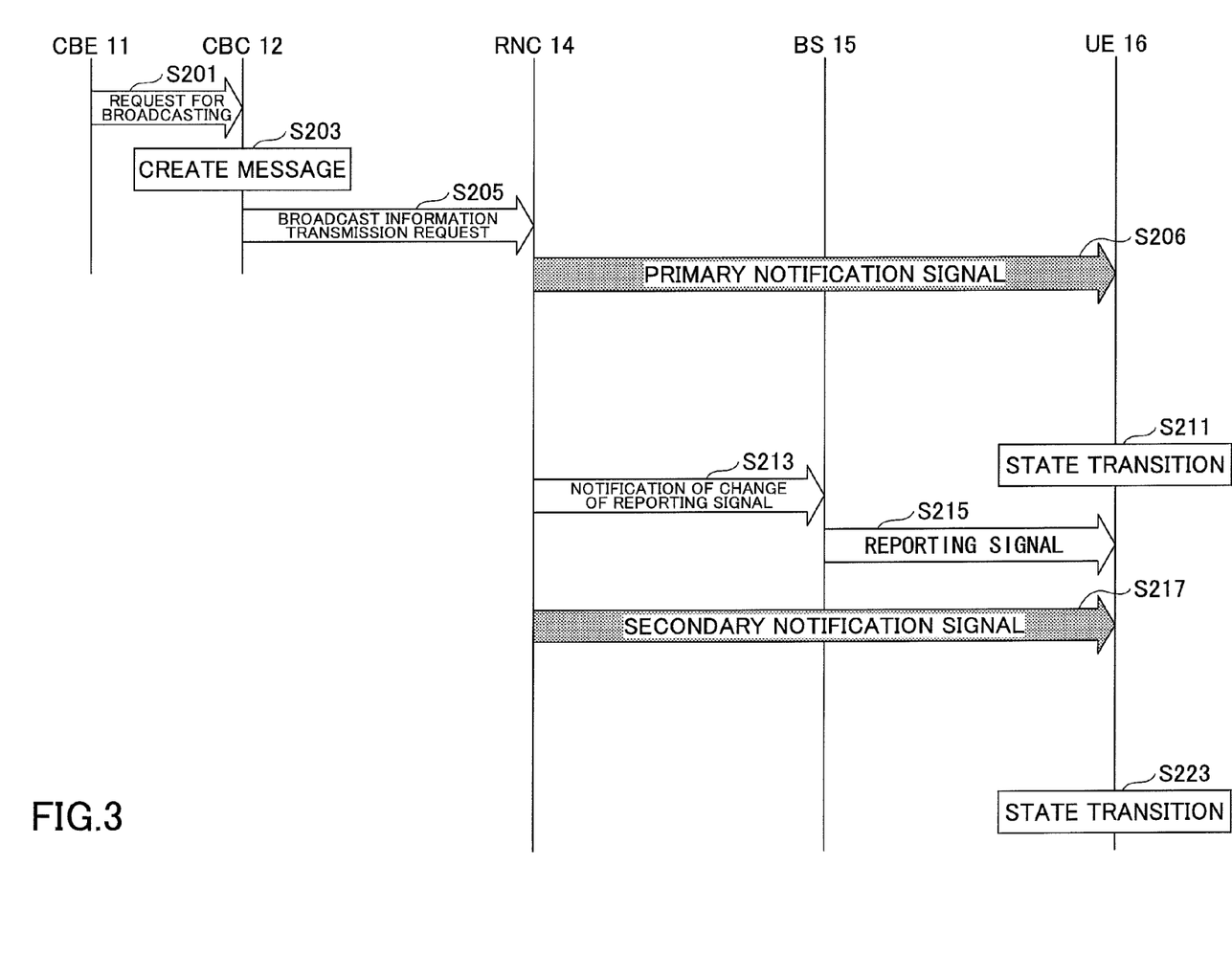
FIG. 3 is a diagram showing a modified example.

FIG. 3 shows such a modified operation example. In general, it is the same as the operation example of FIG. 2. However, it is significantly different in a point that step S207 of requesting the state transition and step S209 of transmitting the command signal in response to that are not performed, prior to step S211 of performing the state transition. In response to receiving the Primary Notification signal at step S206, the user equipment (UE) 16 performs the state transition at step S211. For example, state transition is performed from the FACH state (Cell_FACH) to the idle state (IDLE). Furthermore, the example shown in FIG. 3 is different from the example shown in FIG. 2 in a point that step S219 of requesting the state transition and step S221 of transmitting the command signal in response to that are not performed, prior to step S223 of performing state transition for returning. For example, state transition is performed from the idle state (IDLE) to the FACH state (Cell_FACH).

As referred to in "3.1 Switching of a cell or a RAT," not only the state transition, but also switching to another communication system or to another cell may be performed at steps S211 and S223.

Further, when the user equipment (UE) 16 determines which one of the state transition; the switching of the cell; or the switching of the communication system is to be performed, and determines the destination of the transition or the switching, the user equipment (UE) 16 may decide based on the communication state or the communication signal. For example, when a type of a communication call of a communication signal which is made by the user equipment (UE) 16 is for communication for which a requirement on latency is not strict (which is communication other than voice communication), transition of a state, or switching of a cell or a communication system may be allowed. When it is not, the transition or the switching may be disallowed. As another example, when a communication amount or a data amount of a communication signal which is made by the user equipment (UE) 16 is less than a predetermined threshold value, a determination may be made to perform transition of the state, or switching of the cell or the communication system. When it is not, a determination may be made not to perform the transition or the switching. As another example, when a communication rate of a communication signal which is made by the user equipment (UE) 16 is less than a predetermined threshold value, a determination is made to perform transition of the state, or switching of the cell or the communication system. When it is not, a determination may be made not to perform the transition or the switching. As another example, when a communication signal which is made by the user equipment (UE) 16 is not for important communication, a determination may be made to perform transition of the state, or switching of the cell or the communication system. When it is for important communication, a determination may be made not to perform the transition or the switching. The permissibility determinations of the above-described state transition are for exemplifying purpose only. A permissibility determination may be made from another perspective.

<4. Radio Network Controller>

Figure 4:
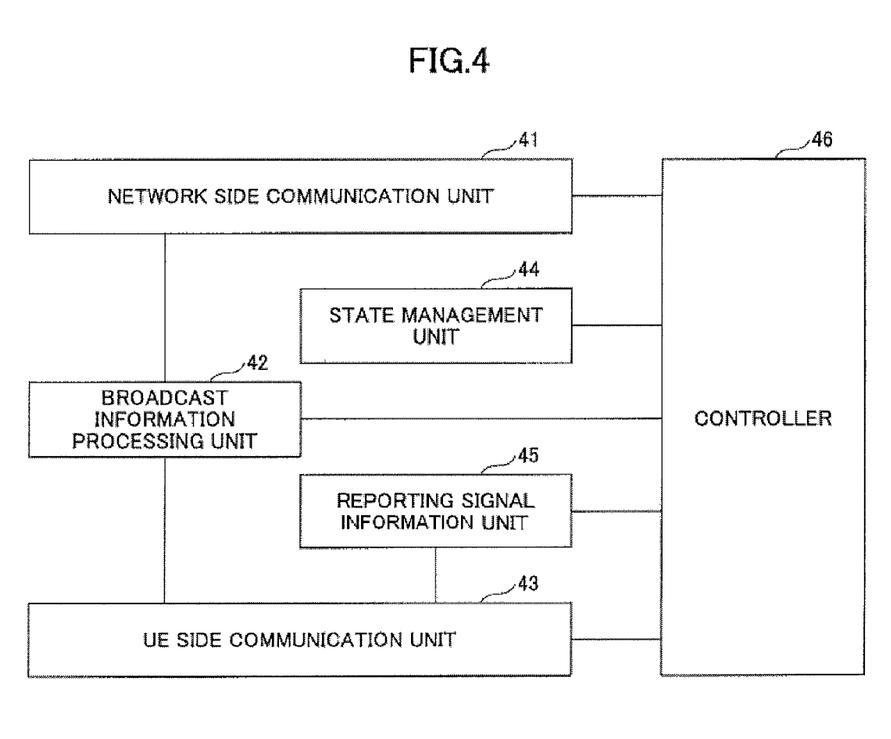
FIG. 4 is a functional block diagram of a radio network controller.

FIG. 4 shows a functional block diagram of the radio network controller (RNC) such as shown in FIG. 1. However, the similar functions may be included in the mobile switching center (mobility management entity (MME)) or a core node other than these. FIG. 6 shows functional units or processing units which are particularly related to the embodiment, among various functional units or processing units included in the communication device. The radio network controller (RNC) 14 includes, at least, a network side communication unit 41; a broadcast information processing unit 42; a UE side communication unit 43; a state management unit 44; a reporting information processing unit 45; and a controller 46.

The network side communication unit 41 receives broadcast information from an upper layer node, such as the cell broadcast center (CBC). The broadcast information may be received together with information specifying an area in which the broadcast information is to be transmitted.

The broadcast information processing unit 42 identifies the broadcast area from the broadcast information received by the network side communication unit 41, and extracts or creates the Primary Notification signal and the Secondary Notification signal.

The UE side communication unit 43 includes a function of transmitting a signal toward user equipment (UE), and a function of receiving a signal from user equipment (UE). The signal to be transmitted toward user equipment includes the Primary Notification signal, the Secondary Notification signal, a control signal, and user data, for example. The signal to be received from user equipment includes a control signal and user data, for example.

The state management unit 44 manages an RRC protocol state (a communication state) of user equipment (UE). Specifically, it manages which one of a predetermined plural number of communication states corresponds to the current communication state of user equipment (UE). For example, the predetermined plural number of communication states includes the cell DCH state (Cell_DCH); the cell FACH state (Cell_FACH); the cell PCH state (Cell_PCH); and the idle state (IDLE).

The reporting information processing unit 45 processes (which includes to create, to change, and to edit) reporting information to be transmitted to the user equipment (UE). For example, when it is determined that the radio network controller (RNC) transmits broadcast information, the reporting information processing unit 45 creates reporting information which indicates transmission timing of the Secondary Notification signal, and the reporting information processing unit 45 passes the changed reporting information to the UE side communication unit 43 under control of the controller 46.

The controller 46 controls the functional units of the radio network controller (RNC). The controller 46 causes the radio network controller (RNC) to execute a portion of the operations which is related to the radio network controller (RNC), among the operations which are explained by referring to FIGS. 2 and 3.

<5. User Equipment>

Figure 5:
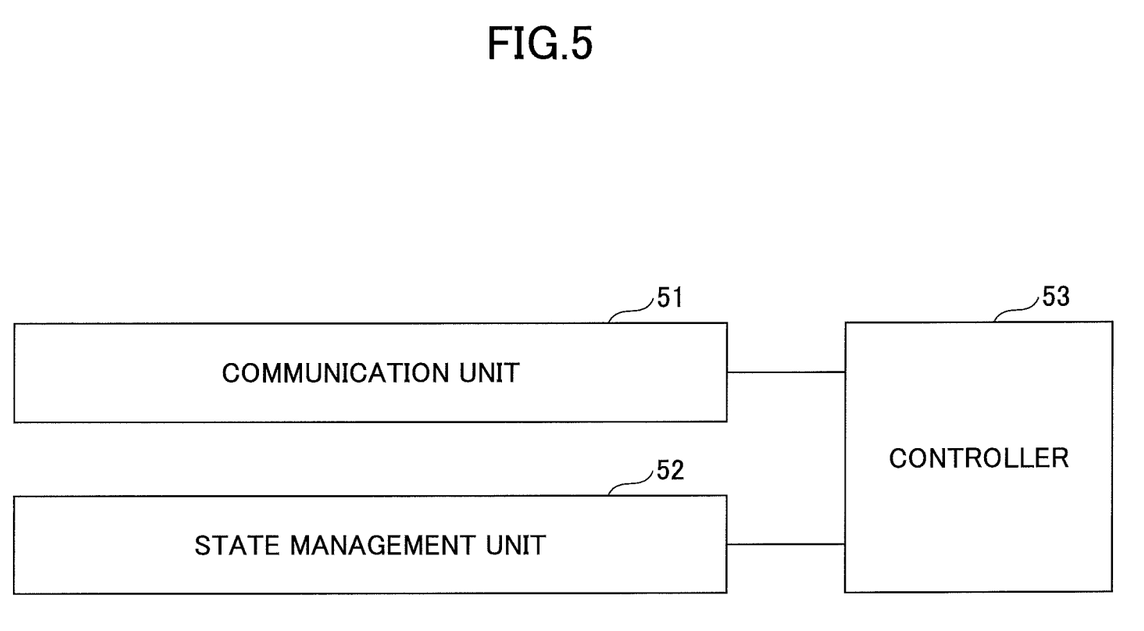
FIG. 5 is a functional block diagram of user equipment.

FIG. 5 shows a functional block diagram of the user equipment. FIG. 5 shows functional units or processing units which are particularly related to the embodiment, among various functional units or processing units included in the user equipment. The user equipment includes, at least, a communication unit 51; a state management unit 52; and a controller 53.

The communication unit 51 includes a function of receiving a signal from a radio access network (RAN) device; and a function of transmitting a signal toward the radio access network (RAN) device. The radio access network (RAN) device is a device that includes both the base station BS and the radio network controller (RNC). The signal received from the radio access network (RAN) device includes, for example, broadcast information, a control signal, and user data. The signal transmitted toward the radio access network (RAN) device includes, for example, a control signal, and user data.

Similar to the state management unit 44 of FIG. 4, the state management unit 52 manages an RRC protocol state (a communication state) of the user equipment UE. Specifically, it manages which one of plural number of communication states corresponds to the current communication state of the user equipment UE. The plural number of communication states includes, for a case of a third generation mobile communication system, the cell DCH state (Cell_DCH); the cell FACH state (Cell_FACH); the cell PCH state (Cell_PCH); and the idle state (IDLE). For the case of an LTE mobile communication system, it includes the connected state (Connected); and the idle state (IDLE).

The controller 53 controls operations of the user equipment. The controller 53 causes the user equipment to execute a portion of the operations related to the user equipment, among the operations which are explained by referring to FIGS. 2 and 3.

Hereinabove, the present invention is explained by referring to the specific embodiment. However, the embodiment is merely illustrative, and variations, modifications, alterations and substitutions could be conceived by those skilled in the art. For example, the present invention may be applied to any suitable mobile communication system that transmits emergency information. In the above explanation, the broadcast information to be broadcast is related to a natural disaster. However, it is not limited to the natural disaster, and it may be something in a man-made situation such as an international dispute. Specific examples of numerical values are used in order to facilitate understanding of the invention. However, these numerical values are simply illustrative, and any other appropriate values may be used, except as indicated otherwise. The separations of the embodiment or the items are not essential to the present invention. Subject matter described in two or more items may be combined and used, and subject matter described in an item may be applied to subject matter described in another item (provided that they do not contradict). For the convenience of explanation, the devices according to the embodiment of the present invention are explained by using functional block diagrams. However, these devices may be implemented in hardware, software, or combinations thereof. The software may be prepared in any appropriate storage medium, such as a random access memory (RAM), a flash memory, a read-only memory (ROM), an EPROM, an EEPROM, a register, a hard disk drive (HDD), a removable disk, a CD-ROM, a database, a server, and the like. Hereinabove, the communication device and the communication method are explained by the embodiment. However, the present invention is not limited to the above-described embodiment, and various modifications and improvements may be made within the scope of the present invention.

LIST OF REFERENCE SYMBOLS

11: Cell broadcast entity (CBE)
12: Cell broadcast center (CBC)
13: Mobile switching center (or mobility management entity (MME))
14: Radio network controller RNC
15: Base station of LTE system (eBN), Base station of 3G system (BS)
16: User equipment
41: Network side communication unit
42: Broadcast information processing unit
43: UE side communication unit
44: State management unit
45: Reporting information processing unit 45
46: Controller
51: Communication unit
52: State management unit
53: Controller

The invention claimed is:

1. A communication device comprising:
a network side communication unit that receives emergency information from an information broadcasting node; and
a UE side communication unit that communicates a communication signal with user equipment through a radio base station,
wherein the UE side communication unit broadcasts a Secondary Notification signal including the emergency information, subsequent to broadcasting a Primary Notification signal providing notice of broadcasting of the emergency information, and individually transmitting a command signal to the user equipment, wherein the command signal is for commanding transition of an RRC protocol state or for commanding switching to another cell,
wherein the transition of the RRC protocol state is from a state in which reception of the emergency information is disabled to a state in which reception of the emergency information is enabled, and
wherein the other cell is the cell in which the user equipment is capable of receiving the Secondary Notification signal irrespective of the RRC protocol state of the user equipment.

2. The communication device according to claim 1, wherein the UE side communication unit transmits the command signal to the specific user equipment which transmits a request signal in response to the Primary Notification signal.

3. The communication device according to claim 2, wherein at least one of permissibility of transmission; a waiting time period for the transmission; and a number of times of retransmission of the request signal by the specific user equipment is indicated by a reporting signal, wherein the reporting signal is transmitted from the UE side communication unit.

4. The communication device according to claim 1, wherein the communication device further includes a state management unit that manages the RRC protocol state of the user equipment,
wherein, when the network side communication unit receives the emergency information, the state management unit determines the specific user equipment for which the RRC protocol state is the state in which the reception of the emergency information is disabled, and
wherein the UE side communication unit transmits the command signal for prompting the transition of the RRC protocol state to the specific user equipment.

5. The communication device according to claim 4, wherein the communication device further includes a determination unit that determines whether the command signal is to be transmitted to the specific user equipment, depending on at least one of a type of a call; a communication amount; a transmission rate; and a priority level of communication performed by the specific user equipment.

6. The communication device according to claim 1, wherein the UE side communication unit memorizes the user equipment to which the command signal is not transmitted, and the UE side communication unit reports to the memorized user equipment by a dedicated signal or by dedicated data transmission.

7. The communication device according to claim 1, wherein the communication device further includes a determination unit that determines whether the command signal is to be transmitted to the user equipment, depending on at least one of a type of a call; a communication amount; a transmission rate; and a priority level of communication performed by the user equipment.

8. A communication method comprising steps of:
receiving emergency information from an information broadcasting node;
broadcasting a Primary Notification signal providing notice of broadcasting of the emergency information;
individually transmitting a command signal to specific user equipment, wherein the command signal is for commanding transition of an RRC protocol state or for commanding switching to another cell; and
broadcasting a Secondary Notification signal including the emergency information,
wherein the transition of the RRC protocol state is from a state in which reception of the emergency information is disabled to a state in which reception of the emergency information is enabled, and
wherein the other cell is the cell in which the user equipment is capable of receiving the Secondary Notification signal irrespective of the RRC protocol state of the user equipment.

9. A communication device comprising:
a communication unit that communicates a communication signal with a radio access device; and
a determination unit that determines whether to perform transition of an RRC protocol state or switching to another cell, when the communication unit receives a broadcast Primary Notification signal, wherein the Primary Notification signal provides notice of broadcasting of emergency information,
wherein the transition of the RRC protocol state is from a state in which reception of the emergency information is disabled to a state in which reception of the emergency information is enabled, wherein the other cell is the cell in which the user equipment is capable of receiving a Secondary Notification signal irrespective of the RRC protocol state of the user equipment, and wherein the communication unit receives the broadcast Secondary Notification signal including the emergency information, subsequent to the transition of the RRC state or the switching to the other cell.

10. A communication method comprising steps of:

determining to perform transition of an RRC protocol state or switching to another cell, when a broadcast Primary Notification signal is received from a radio access device, wherein the Primary Notification signal provides notice of broadcasting of emergency information; and receiving a broadcast Secondary Notification signal, subsequent to the transition of the RRC protocol state or the switching to the other cell, wherein the Secondary Notification signal includes the emergency information, wherein the transition of the RRC protocol state is from a state in which reception of the emergency information is disabled to a state in which reception of the emergency information is enabled, and wherein the other cell is the cell in which the user equipment is capable of receiving the Secondary Notification signal irrespective of the RRC protocol state of the user equipment.

* * * * *